(12) United States Patent
Soula et al.

(10) Patent No.: US 7,963,477 B2
(45) Date of Patent: Jun. 21, 2011

(54) AIRCRAFT THAT COMPRISES A STRUCTURE THAT ENSURES THE STRUCTURAL AND ELECTRICAL FUNCTIONS

(75) Inventors: Denis Soula, Toulouse (FR); Bruno Cacciaguerra, Clermont le Fort (FR); Alain Tropis, Auzeville Tolosane (FR); Nicolas Alglave, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 501 days.

(21) Appl. No.: 12/062,791

(22) Filed: Apr. 4, 2008

(65) Prior Publication Data
US 2008/0251636 A1      Oct. 16, 2008

(30) Foreign Application Priority Data
Apr. 4, 2007   (FR) .................................... 07 54269

(51) Int. Cl.
*B64D 45/00* (2006.01)
(52) U.S. Cl. ....................................... 244/1 A; 244/119
(58) Field of Classification Search .................. 244/119, 244/123.1, 131–133, 1 A; 361/212, 218
See application file for complete search history.

(56) References Cited

U.S. PATENT DOCUMENTS

| | | | | |
|---|---|---|---|---|
| 3,420,477 | A * | 1/1969 | Howard | 244/133 |
| 3,559,923 | A * | 2/1971 | Moore | 244/119 |
| 4,502,092 | A | 2/1985 | Bannink, Jr. et al. | |
| 4,574,325 | A * | 3/1986 | Holton | 244/1 A |
| 4,760,493 | A * | 7/1988 | Pearson | 244/1 A |
| 5,863,667 | A * | 1/1999 | Poggi | 428/608 |
| 6,320,118 | B1 * | 11/2001 | Pridham et al. | 244/1 A |
| 6,375,120 | B1 * | 4/2002 | Wolnek | 244/119 |
| 7,277,266 | B1 * | 10/2007 | Le et al. | 361/218 |
| 7,635,106 | B2 * | 12/2009 | Pham et al. | 244/131 |
| 7,651,320 | B2 * | 1/2010 | Hansen | 416/1 |
| 2005/0213278 | A1 * | 9/2005 | Hawley | 361/212 |

FOREIGN PATENT DOCUMENTS

| | | |
|---|---|---|
| GB | 2 212 580 A | 7/1989 |
| WO | 99/51494 A | 10/1999 |

* cited by examiner

*Primary Examiner* — Galen Barefoot
(74) *Attorney, Agent, or Firm* — Young & Thompson

(57) ABSTRACT

An aircraft includes a structure with structural elements (16) that are assembled to form a three-dimensional framework to which an aerodynamic envelope (14) is attached. At least some structural elements (16) are at least partly metallic and—at the connection with the aerodynamic envelope (14)—including an interface that is made of material that has a conductivity that is below a threshold on the order of 10,000 S/m so as to form at least one electrical path that ensures the functions of electric return and metallization of the electrical systems, whereby connections that ensure the electrical conduction are provided between the structural elements (16).

3 Claims, 3 Drawing Sheets

Figure 1:
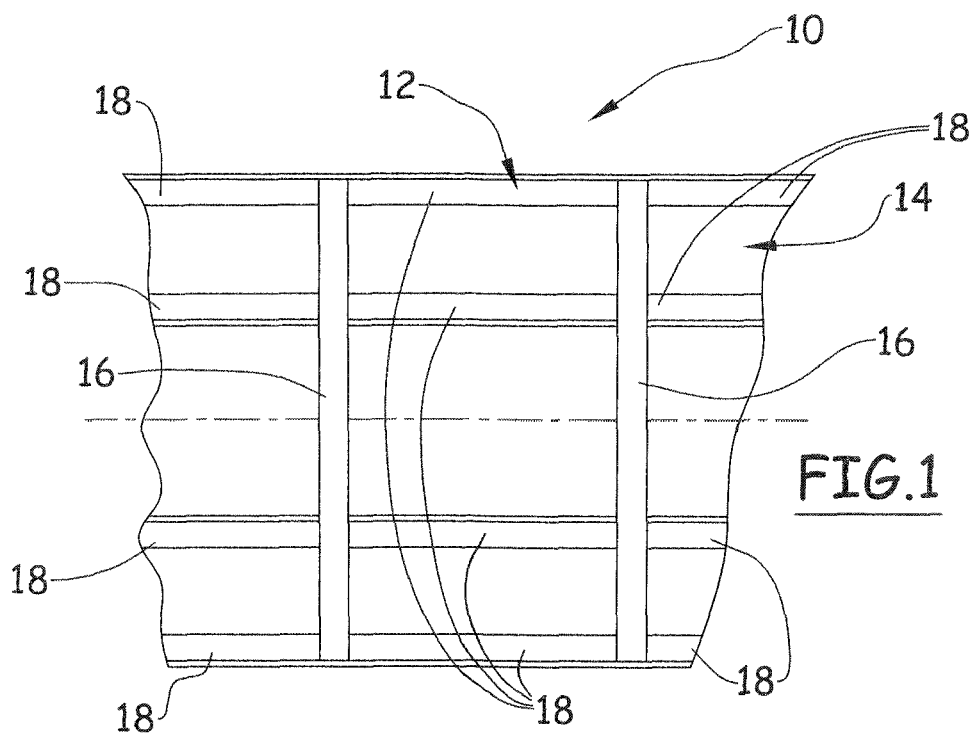

AIRCRAFT THAT COMPRISES A STRUCTURE THAT ENSURES THE STRUCTURAL AND ELECTRICAL FUNCTIONS

This invention relates to an aircraft that comprises a structure that ensures the structural and electrical functions, whereby this invention is more particularly suitable for an aircraft that comprises an aerodynamic envelope that is partly made of composite material.

In a known manner, an aircraft comprises a structure that primarily ensures the function of absorbing stresses to which is attached an envelope, called aerodynamic envelope below, imparting to the aircraft its aerodynamic properties. Thus, the structure comprises beams, frames, stiffeners, etc., that are metal and assembled together so as to ensure in particular the absorption of stresses.

In a known manner, the aerodynamic envelope comes in the form of a juxtaposition of metal panels or sheet metal pieces connected to the structure by riveting or other suitable means.

This metal envelope makes it possible to form a Faraday cage that protects the elements that are placed inside.

According to another characteristic, this envelope ensures the functions of electric current return and metallization or putting the electrical systems at the same potential.

So as to reduce the energy consumption of an aircraft, one approach consists in reducing the on-board weight, in particular by replacing certain metal elements by elements made of composite material.

Thus, for the new generations of aircraft, the metal panels of the aerodynamic envelope tend to be replaced by panels that are made of composite material, in particular if said panels are not able to be subjected to high temperatures.

These composite materials, however, have a low electrical conductivity. Actually, even if some fibers, such as, for example, the carbon fibers, have a good electrical conductivity, the fact that they are immersed in a resin that is insulating imparts to the unit a low electrical conductivity.

The aerodynamic envelope no longer forming a Faraday cage, it is necessary to provide other systems for protection of the electrical systems, for example to use shielded cables to direct the electric current.

According to another problem, it is necessary to provide additional electrical cables to ensure the functions of electric current return or metallization of the electrical systems.

Consequently, the use of composite materials for the aerodynamic envelope that aims at reducing the on-board weight leads to adding electrical cables or to using shielded cables that in exchange contribute to increasing the on-board weight. Even if an increase in on-board weight is obtained in the unit, this increase is not optimal.

Approaches have been developed to resolve in particular the problem that is linked to the Faraday cage. Thus, a first approach consists in introducing a wire cloth into the composite material or in attaching a metal sheet or a flexible metal grid to the aerodynamic envelope.

Even if these approaches make it possible to reform a Faraday cage, they are not satisfactory because they do not make it possible to achieve the functions of electric current return and metallization of the electrical systems.

In addition, they contribute to increasing the on-board weight and to complicating the production of the aerodynamic envelope.

The document US2005/0213278 proposes another approach that consists in using metal strips that are located at the junctions of composite-material panels that form the aerodynamic envelope and are arranged outside of said envelope, in such a way as to secure said metal strips by means of conductive connecting elements.

Even if this approach makes it possible to reform the Faraday cage, it is not completely satisfactory due to the addition of the conductive connecting elements that complicate the production of the aerodynamic envelope and because the functions of current return and metallization of the electrical systems are only specific to the extent that they can be operated only at the level of conductive connecting elements that are located below the aerodynamic envelope.

Also, this invention aims at remedying the drawbacks of the prior art by proposing an aircraft with a new structure that makes it possible to ensure in particular the functions of electric current return and putting the electrical systems at the same potential.

For this purpose, the invention has as its object an aircraft that comprises a structure with structural elements that are assembled to form a three-dimensional structure to which an aerodynamic envelope is attached, characterized in that at least some structural elements are at least partly metallic and, at the connection with the aerodynamic envelope, comprise an interface that is made of material that has little electrical conductivity so as to form at least one electrical path that ensures the functions of electric return and metallization of the electrical systems, whereby connections that ensure the electrical conduction are provided between said structural elements.

Figure 2:
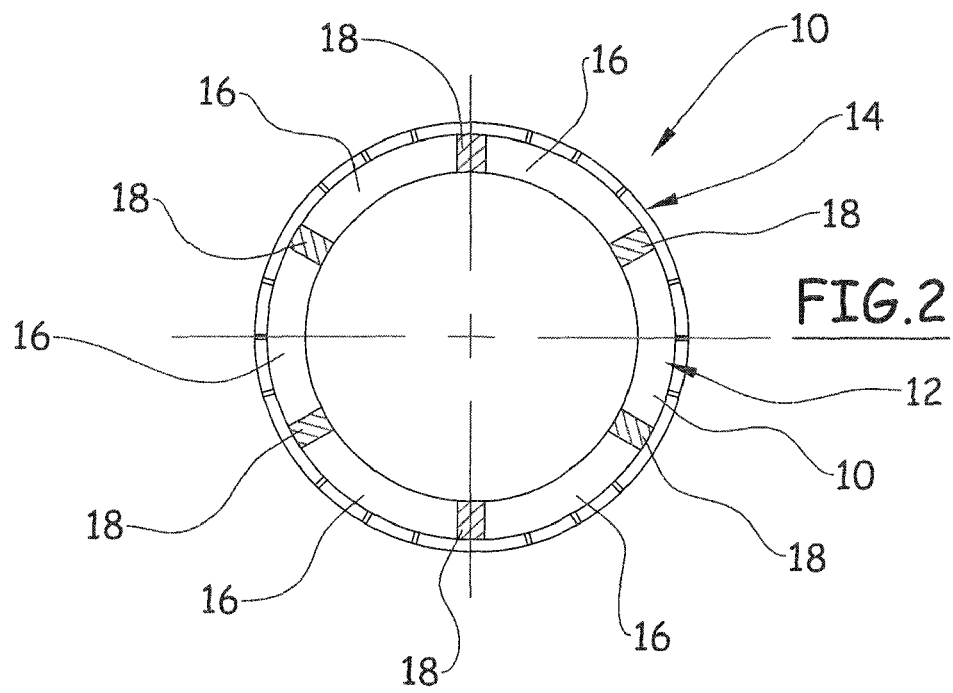
Figure 3A:
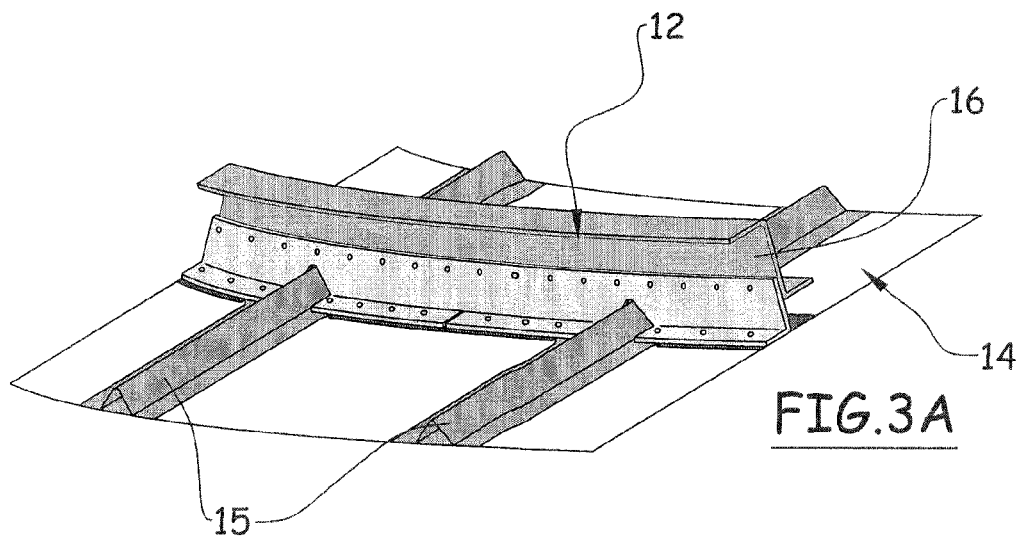
Figure 4A:
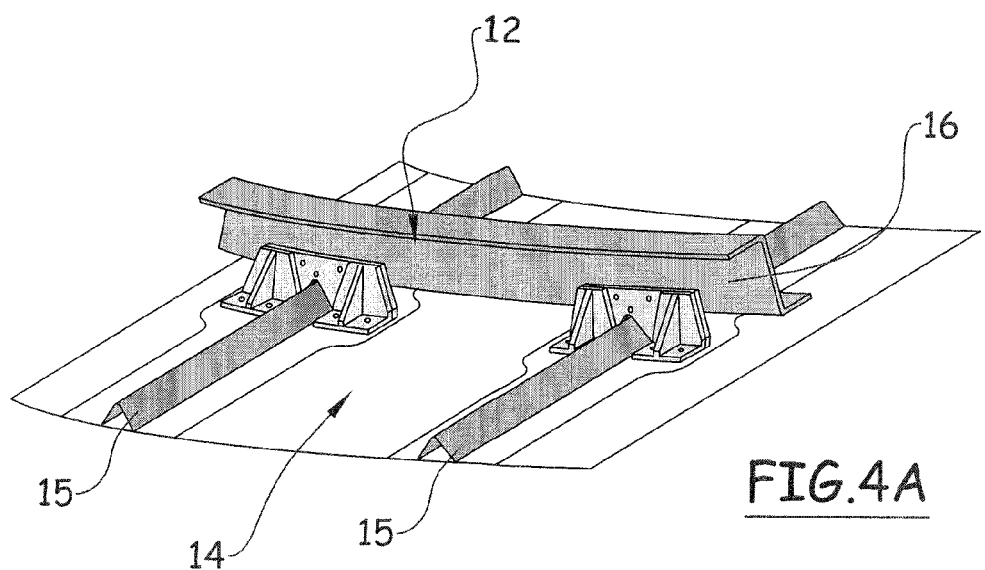
Figure 3B:
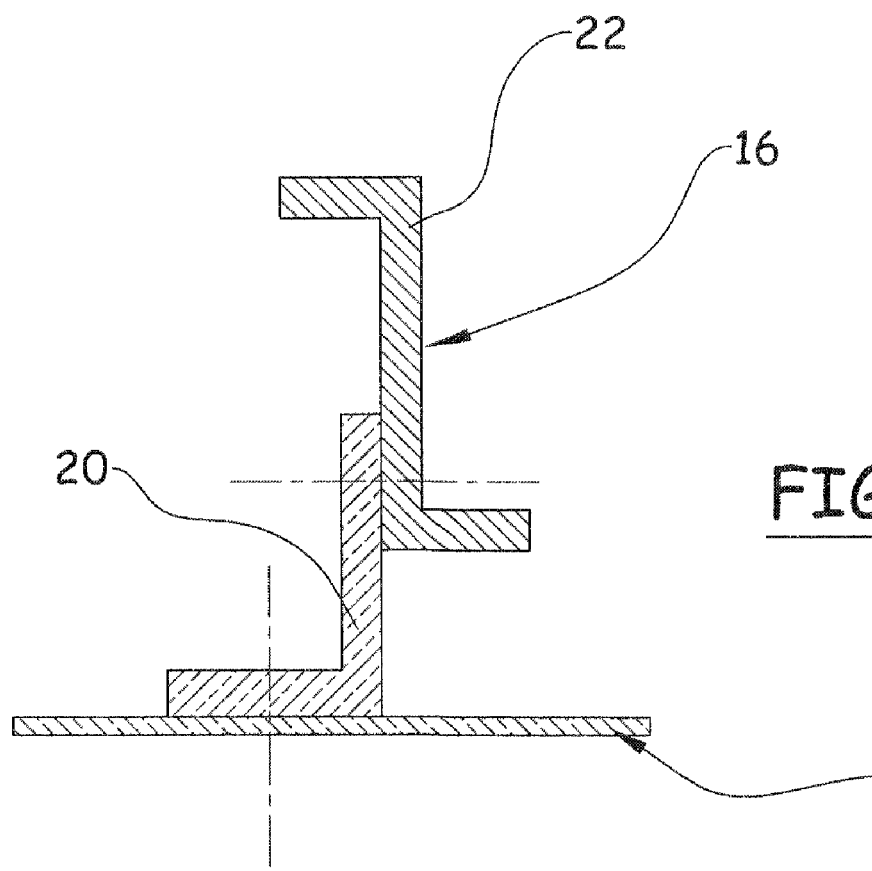
Figure 4B:
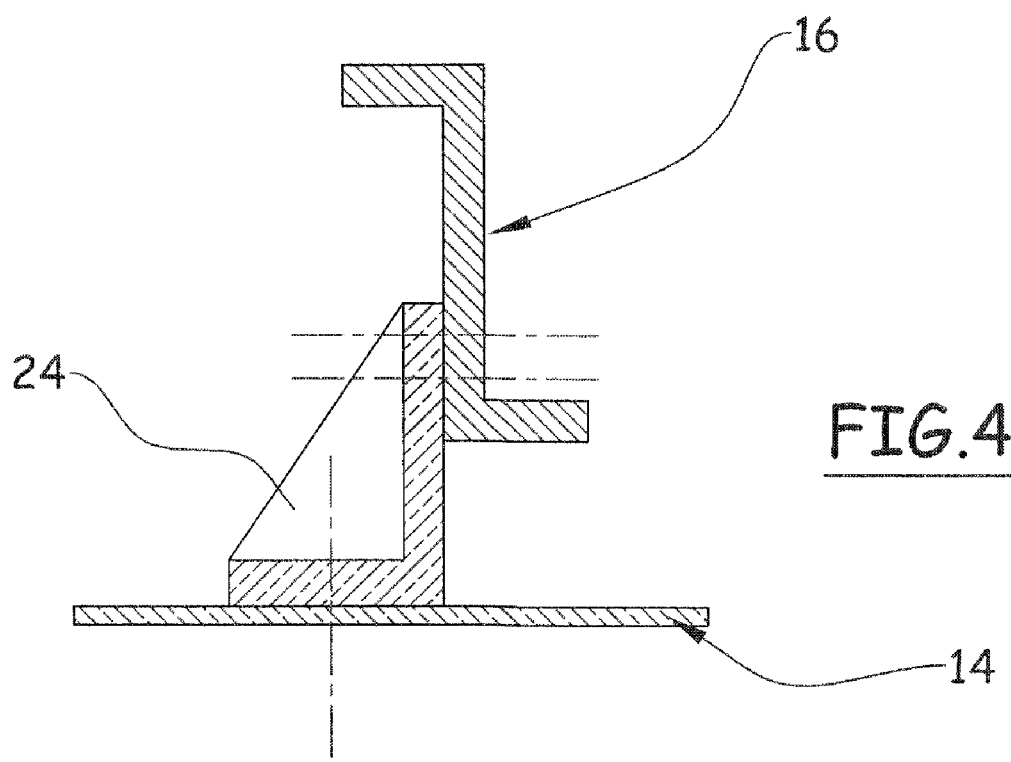

Other characteristics and advantages will emerge from the following description of the invention, a description that is provided only by way of example, opposite the attached drawings, in which:

FIG. 1 is a diagrammatic representation that illustrates from the inside an aircraft structure along a longitudinal cutaway, FIG. 2 is a diagrammatic representation that illustrates in cross-section the aircraft structure of FIG. 1, FIG. 3A is a perspective view that illustrates a circumferential element of the structure of an aircraft according to a first variant of the invention, FIG. 3B is a cutaway along a longitudinal radial plane that illustrates in details the circumferential element of FIG. 3A, FIG. 4A is a perspective view that illustrates a circumferential element of the structure of an aircraft according to another variant of the invention, and FIG. 4B is a cutaway along a longitudinal radial plane that illustrates in details the circumferential element of FIG. 4A.

In FIGS. 1 and 2, an aircraft fuselage 10 is diagrammatically shown. The invention, however, is not limited to this part of the aircraft and can be applied to other parts of the aircraft, for example to the wings, to the stabilizer, . . . .

The fuselage 10 comprises a structure 12 to which is attached a so-called aerodynamic envelope 14 whose outside face is able to be in contact with the air flows.

The aerodynamic envelope 14 comprises juxtaposed panels, able to be made integral by any means suitable to the structure 12. At least some of these panels can be made of composite materials so as to reduce the on-board weight and thereby the energy consumption of the aircraft.

These composite materials are composed of fibers, in particular carbon, graphite, basalt, aramide or glass, for example, woven in a matrix made of organic resin such as, for example, an epoxy, thermoplastic or thermosetting resin.

Even if certain fibers can be made of an electrically conductive material, whereby the matrix is made of an insulating material, non-conductive, and the fibers are not necessarily connected to one another or have an inadequate section, the panel that comprises said fibers has a low electrical conductivity.

According to the variants, at their inside faces, the panels that form the aerodynamic envelope 14 can comprise ribs, in particular made of composite materials, reinforcing the mechanical characteristics of the aircraft.

The shapes, the sizes, and the nature of the materials that are used for the aerodynamic envelope can vary from one aircraft model to the next. Since the aerodynamic envelope is known to one skilled in the art, it is not presented in more detail.

In a known way, the structure 12 comprises circumferential elements 16 that are placed in planes that are transverse to the fuselage that are connected to one another by spars or beams 18 of said longitudinal elements that are placed in longitudinal directions.

Longitudinal direction is defined as the direction that starts from the front end to the rear end of the aircraft, whereby the transverse planes are planes that are approximately perpendicular to the longitudinal direction.

A circumferential element 16 generally consists of several elements put end to end.

Thus, the assembly of the circumferential elements 16 and longitudinal elements 18 form a framework that imparts in particular to the aircraft the mechanical characteristics that are required and that ensure the absorption of stresses.

More generally, the structure 12 comprises structural elements in different directions (the longitudinal elements 18 and the circumferential elements 16 in the illustrated example) that make it possible to obtain, once assembled, a framework in the form of a three-dimensional mesh to which is attached an aerodynamic envelope 14. The structural elements are assembled together by suitable means, for example by riveting, bolting, welding, or the like.

Likewise, the aerodynamic envelope 14 is connected to the structure 12 by any suitable means, for example by riveting.

The shapes and the sizes of structural elements can vary from one aircraft model to the next.

According to the invention, at least some structural elements 16, 18 are at least partly metallic and comprise, at the connection with the aerodynamic envelope 14, an interface that consists of a material that has a conductivity that is below a threshold on the order of 10,000 S/m, which corresponds to a material that has little or no electrical conductivity so as to ensure the function of electrical insulation between the internal structure 16, 18 and the aerodynamic envelope 14 so as to form at least one electrical path that ensures the functions of electric return and the metallization of the electrical systems.

Advantageously, the interface is made of a material that has a non-zero conductivity that corresponds to a material that has little electrical conductivity for allowing the diffusion of a strong lightning current of the aerodynamic envelope 14 in the internal structure 16, 18 so as to avoid the possible formation of an electric arc between the aerodynamic envelope 14 and the internal structure 16, 18. Connections that ensure the electrical conduction are provided between the structural elements that are used to form an electrical path that ensures the functions of electric return and metallization of the electrical systems.

According to an embodiment, whereby only the structural elements that form at least one electrical path ensure the functions of electric return and metallization, electrical systems are at least partly metallic and comprise—at the connection with the aerodynamic envelope 14—an interface that is made of material that has a conductivity that is below a threshold on the order of 10,000 S/m and is preferably not zero.

According to another variant, the structural elements that can form a Faraday cage under the aerodynamic envelope are at least partly metallic and comprise—at the connection with the aerodynamic envelope 14—an interface that is made of material that has a conductivity that is below a threshold on the order of 10,000 S/m and is preferably not zero. Connections that ensure the electrical conduction are provided between the structural elements that can form a Faraday cage under the aerodynamic envelope.

According to a first embodiment that is illustrated in FIGS. 3A and 3B, the structural elements that comprise an interface that is made of material that has a conductivity that is below a threshold on the order of 10,000 S/m and is preferably not zero are produced in two parts, a first part 20 that can be in contact with the aerodynamic envelope 14 that is made of a material that has a conductivity that is below a threshold on the order of 10,000 S/m and is preferably not zero, for example made of a composite material that is based on carbon fibers, whereby the second part 22 is made of an electrically conductive material, in particular metallic, for example an aluminum alloy. The first and second parts 20 and 22 are assembled by any suitable means, in particular by riveting.

By way of example, as illustrated in FIG. 3A, the first part 20 has an L-shaped section, whereby the second metal part 22 is able to include at least one fold line so as to increase its moment of inertia.

According to another embodiment, the surface of the structural elements in contact with the aerodynamic envelope comprises a coating that is made of a material that has a conductivity that is below a threshold on the order of 10,000 S/m and is preferably not zero, whereby the structural elements are made of an electrically conductive material, preferably metallic, for example an aluminum alloy.

According to another embodiment that is illustrated in FIGS. 4A and 4B, the structural elements that comprise an interface that is made of material that has a conductivity that is below a threshold on the order of 10,000 S/m and is preferably not zero are made of an electrically conductive material and are not in direct contact with the aerodynamic envelope 14. In this case, the connection between the structural elements and the aerodynamic envelope is ensured by connecting elements 24, for example brackets of which one of the branches is connected to said aerodynamic envelope 14 and of which the other branch is connected to at least one structural element, whereby said connecting elements 24 are made of a material that has a conductivity that is below a threshold on the order of 10,000 S/m and is preferably not zero, for example made of a composite material based on carbon fibers.

According to the invention, it is important that the structural elements be isolated from the parts of the aerodynamic envelope 14 that is made of composite material, in particular those that have fibers made of electrically conductive material, to prevent fibers that are made of electrically conductive material of the aerodynamic envelope from being in contact with the structural elements that can conduct an electric current.

The invention ensures the following advantages:

It is not necessary to provide additional electrical cables to ensure the functions of electric current return and metallization of the electrical systems that are ensured by the structural elements that are partly metallic. Thus, in contrast to the prior art, the increase in on-board weight that comes from the use of composite materials at the aerodynamic envelope 14 is not limited by the use of additional electrical cables.

According to another advantage, according to the variant that is illustrated in FIGS. 3A and 3B, a reduction of the on-board weight is achieved to the extent that the structural elements that were previously entirely metallic are replaced by structural elements that are partly made of composite material.

Finally, the three-dimensional mesh that is made of electrically conductive material and is formed by the structural elements that are placed under the aerodynamic envelope makes it possible to find a Faraday cage phenomenon that is approximately equivalent to that obtained by the metallic aerodynamic envelope of the prior art. This characteristic theoretically makes it possible to make the protection of electrical systems unnecessary or to reduce their level of protection.

The invention claimed is:

1. An aircraft comprising:
    a structure (12) with structural elements (16, 18) that are assembled to form a three-dimensional framework;
    an aerodynamic envelope (14) attached to said structural elements,
    wherein at least some of said structural elements (16, 18) are at least partly metallic and electrically connected to each other so that said at least some structural elements provide electric return and metallization for electrical systems of the aircraft and a Faraday cage under said aerodynamic envelope, and wherein said aerodynamic envelope is made of composite material without a metallic layer; and
    an interface at a connection of said at least some structural elements with the aerodynamic envelope, said interface being made of material that has a conductivity that is below a threshold on the order of 10,000 S/m and is not zero so as to diffuse lightning current of said aerodynamic envelope in said at least some structural elements and avoid an electric arc between said aerodynamic envelope and said at least some structural elements.

2. The aircraft according to claim 1, wherein said at least some structural elements are made in two parts, a first part (20) that contacts the aerodynamic envelope (14) and comprises said interface, and a second part (22) that is made of electrically conductive material.

3. The aircraft according to claim 1, wherein said interface comprises a coating that has a conductivity that is below a threshold on the order of 10,000 S/m and is not zero.

* * * * *